United States Patent
Nakamura et al.

(10) Patent No.: US 10,655,525 B2
(45) Date of Patent: May 19, 2020

(54) EMISSION CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Takashi Nakamura, Toyota (JP); Noriyasu Kobashi, Hachioji (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/149,465

(22) Filed: Oct. 2, 2018

(65) Prior Publication Data
US 2019/0107027 A1 Apr. 11, 2019

(30) Foreign Application Priority Data
Oct. 6, 2017 (JP) ................................. 2017-196210

(51) Int. Cl.
| | |
|---|---|
| *F01N 11/00* | (2006.01) |
| *F01N 9/00* | (2006.01) |
| *F01N 3/023* | (2006.01) |
| *B01D 46/44* | (2006.01) |
| *B01D 46/00* | (2006.01) |

(52) U.S. Cl.
CPC ............ *F01N 9/002* (2013.01); *B01D 46/006* (2013.01); *B01D 46/446* (2013.01); *F01N 3/023* (2013.01); *B01D 2273/18* (2013.01); *B01D 2279/30* (2013.01); *F01N 2550/04* (2013.01); *F01N 2900/1406* (2013.01); *F01N 2900/16* (2013.01); *F01N 2900/1606* (2013.01)

(58) Field of Classification Search
CPC ......... F01N 2560/08; F01N 2900/1406; F01N 2900/1606
See application file for complete search history.

(56) References Cited

U.S. PATENT DOCUMENTS

| | | | | |
|---|---|---|---|---|
| 2014/0318883 | A1* | 10/2014 | Noguchi | E02F 9/0866 180/309 |
| 2019/0063284 | A1* | 2/2019 | Santillo | F01N 11/007 |

FOREIGN PATENT DOCUMENTS

JP 2009-036183 2/2009

\* cited by examiner

*Primary Examiner* — Jonathan R Matthias
(74) *Attorney, Agent, or Firm* — Finnegan, Henderson, Farabow, Garrett & Dunner, LLP

(57) ABSTRACT

An emission control device for an internal combustion engine is configured to perform a particulate matter trap function of trapping, with a particulate filter, particulate matter contained in exhaust gas which flows in an exhaust passage of the internal combustion engine. The emission control device includes a controller. The controller is configured to calculate a particulate matter accumulation amount, which is a total amount of particulate matter trapped by the particulate filter based on an operation condition of the internal combustion engine. The controller is configured to stop calculating the particulate matter accumulation amount when the particulate matter trap function is not functioning.

2 Claims, 6 Drawing Sheets

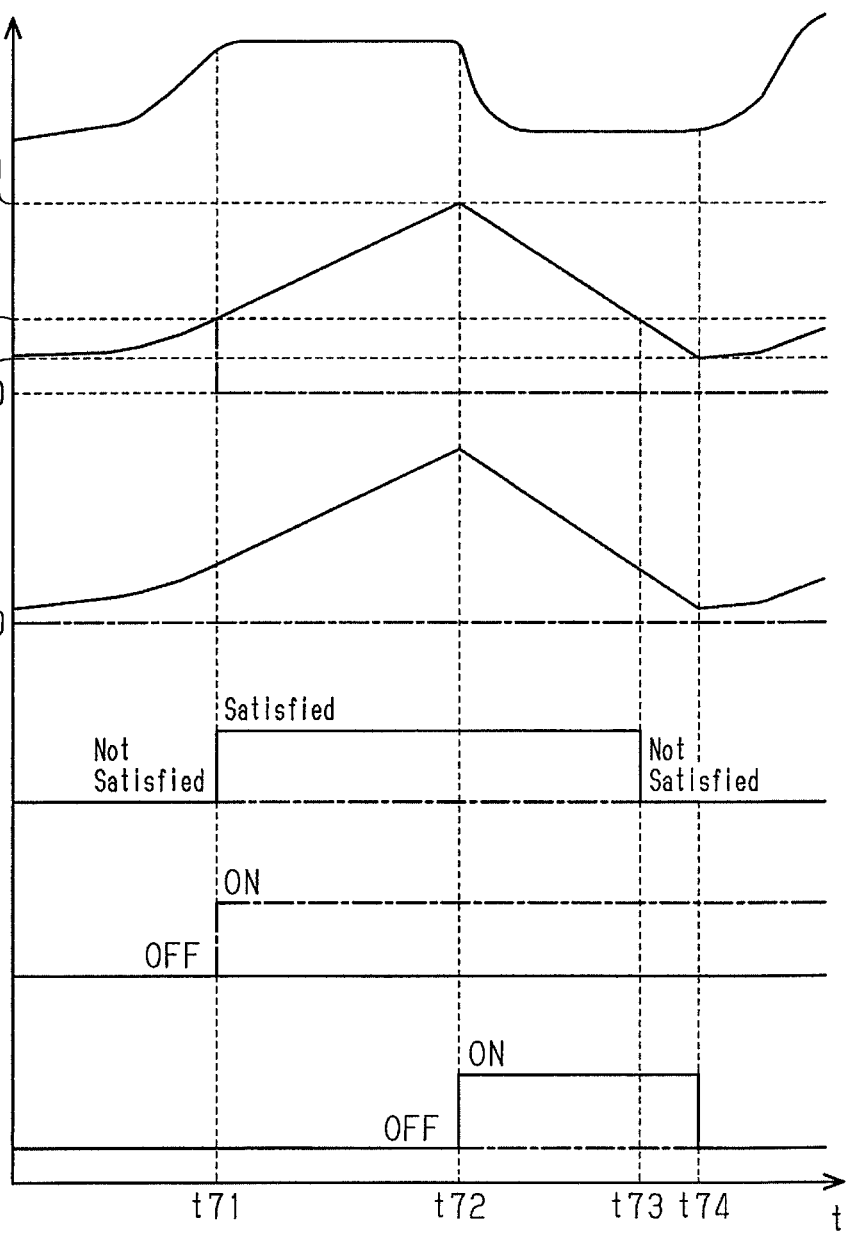

EMISSION CONTROL DEVICE FOR INTERNAL COMBUSTION ENGINE

CROSS REFERENCE TO RELATED APPLICATION

This application claims priority from Japanese Patent Application No. 2017-196210, filed on Oct. 6, 2017, the disclosure of which is incorporated herein by reference in its entirety.

BACKGROUND

The present disclosure relates to an emission control device for an internal combustion engine.

Japanese Laid-Open Patent Publication No. 2009-36183 describes an emission control device for an internal combustion engine. The emission control device includes a particulate matter (hereinafter referred to as PM) filter provided in an exhaust passage of the internal combustion engine. The PM filter traps PM contained in exhaust gas. PM includes a substance such as soot generated when fuel is burned in the engine main body of the internal combustion engine and ash generated when lubricating oil is burned. In the emission control device described in the above document, the amount of PM contained in exhaust gas emitted from the engine main body to the exhaust passage is calculated in accordance with the operation condition of the internal combustion engine. A PM accumulation amount, which is the total amount of PM trapped by the PM filter, is calculated by cumulating the calculated PM amount at predetermined intervals. In accordance with the calculated PM accumulation amount, the emission control device executes filter regeneration control for burning and removing PM trapped by the PM filter.

In some cases, when the PM filter is inadvertently left uninstalled during maintenance of the internal combustion engine or when an abnormality occurs in the PM filter due to some reasons, the emission control device hardly traps PM using a PM filter. In this case, the PM accumulation amount calculated by the emission control device no longer indicates the state of the actual emission control device in which PM has hardly been trapped.

SUMMARY

One aspect of an emission control device for an internal combustion engine is configured to perform a particulate matter trap function of trapping, with a particulate filter, particulate matter contained in exhaust gas which flows in an exhaust passage of the internal combustion engine. The emission control device includes a controller. The controller is configured to calculate a particulate matter accumulation amount, which is a total amount of particulate matter trapped by the particulate filter based on an operation condition of the internal combustion engine. The controller is configured to stop calculating the particulate matter accumulation amount when the particulate matter trap function is not functioning.

In the emission control device, when the particulate matter accumulation amount is calculated although the particulate matter trap function is not functioning, the calculated particulate matter accumulation amount no longer indicates the state of the actual emission control device in which particulate matter has hardly been trapped. In the above configuration, when the particulate matter trap function is not functioning, the emission control device stops calculating the particulate matter accumulation amount. Thus, the above configuration prevents the calculation value of an erroneous particulate matter accumulation amount from being indicated even if particulate matter has hardly been trapped.

Further, it is desirable that the emission control device includes a pressure sensor configured to detect upstream pressure in an exhaust gas flow of a position in the exhaust passage where the particulate filter is designed to be provided. The controller is configured to determine that the particulate matter trap function is not functioning if the upstream pressure calculated based on an output signal from the pressure sensor is less than upstream pressure that is estimated based on an assumption that the particulate filter is provided.

When the particulate filter is provided in the exhaust passage of the internal combustion engine, the pressure loss becomes larger than that when the particulate filter is not provided. Thus, when the particulate filter is not provided, the upstream pressure of where the particulate filter is designed to be provided tends to be lower than that when the particulate filter is provided.

The above configuration includes the pressure sensor configured to detect the upstream pressure of where the particulate filter is designed to be provided. The controller determines that the particulate matter trap function is not functioning if the upstream pressure calculated based on an output signal from the pressure sensor is less than the upstream pressure that is estimated based on the assumption that the particulate filter is provided. Thus, the state of the particulate matter trap function can be properly identified in the emission control device by taking into account the upstream pressure calculated based on an output signal of the pressure sensor.

Further, it is desirable that the emission control device includes a pressure sensor configured to detect upstream pressure in an exhaust gas flow of a position in the exhaust passage where the particulate filter is designed to be provided. The controller is configured to calculate a particulate matter accumulation amount, which is a total amount of particulate matter trapped by the particulate filter based on an output signal from the pressure sensor. A particulate matter accumulation amount calculated based on an operation condition of the internal combustion engine is defined as a first accumulation amount. A particulate matter accumulation amount calculated based on the output signal from the pressure sensor is defined as a second accumulation amount. The emission control device is configured to determine that the particulate matter trap function is not functioning when a subtraction value obtained by subtracting the second accumulation amount from the first accumulation amount is greater than or equal to a predetermined value.

The particulate filter of the emission control device traps particulate matter so that the pressure loss increases in the exhaust passage of the internal combustion engine. Thus, as the particulate matter accumulation amount of the particulate filter becomes larger, the upstream pressure of exhaust gas of where the particulate filter is designed to be provided tends to become higher in the exhaust passage.

In the above configuration, the accumulation amount of particulate matter trapped by the particulate filter is calculated based on an output signal from the pressure sensor, which is configured to detect the upstream pressure of where the particulate filter is designed to be provided. The particulate matter accumulation amount calculated based on the output signal from the pressure sensor remains substantially unchanged when the particulate matter trap function is not functioning in the emission control device. The particulate matter accumulation amount calculated based on the operation condition of the internal combustion engine changes when the internal combustion engine is running. Thus, the subtraction value obtained by subtracting the second accumulation amount, which is a particulate matter accumulation amount calculated based on an output signal from the pressure sensor, from the first accumulation amount, which is a particulate matter accumulation amount calculated based on the operation condition of the internal combustion engine, tends to be large when the particulate matter trap function is not functioning in the emission control device. Whether or not the particulate matter trap function is provided in the emission control device can be determined based on the subtraction value being greater than or equal to the predetermined value. Thus, the state of the particulate matter trap function can be properly identified in the emission control device by comparing the particulate matter accumulation amount calculated based on the operation condition of the internal combustion engine with the particulate matter accumulation amount calculated based on the output signal of the pressure sensor.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings:

FIGS. 7A to 7F are timing charts showing changes in each parameter in the filter regeneration control.

DETAILED DESCRIPTION

First Embodiment

An emission control device for an internal combustion engine according to a first embodiment will now be described with reference to FIGS. 1 to 4E. In the present embodiment, an example in which an emission control device is applied to a gasoline engine serving as an internal combustion engine will be described.

Figure 1:
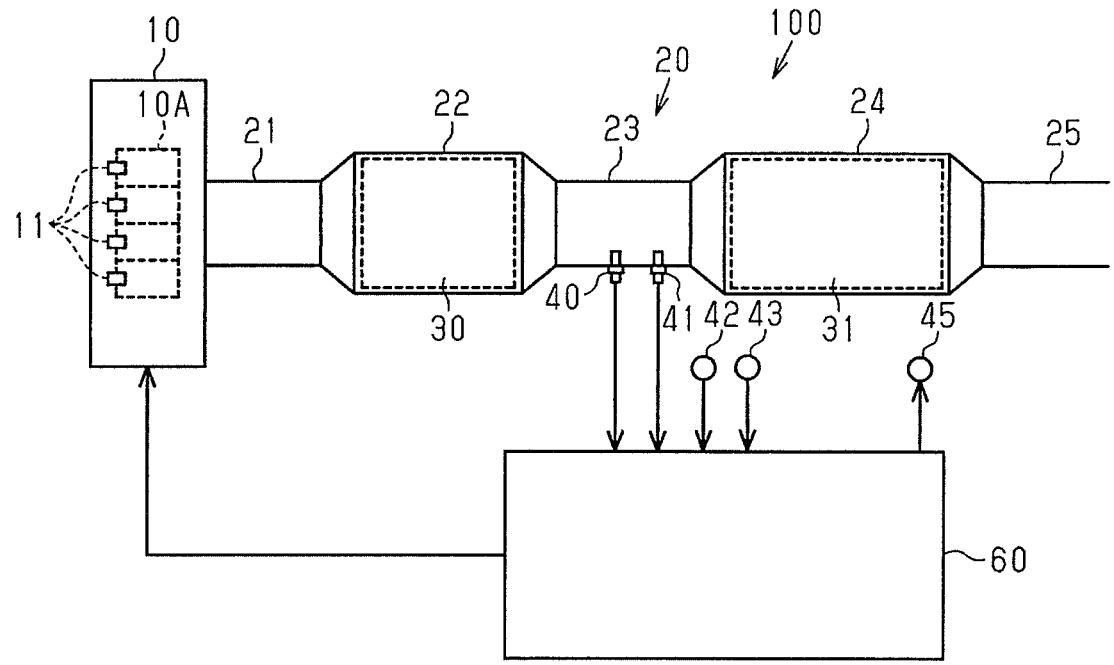
FIG. 1 is a schematic diagram showing the structure of an emission control device for an internal combustion engine according to a first embodiment.

As shown in FIG. 1, the internal combustion engine includes an engine main body 10 provided with combustion chambers 10A. The engine main body 10 includes multiple fuel injection valves 11, which are used to supply fuel to the combustion chambers 10A. The internal combustion engine includes an emission control device 100 provided with an exhaust passage 20, which is coupled to the engine main body 10. Exhaust gas is emitted from the combustion chamber 10A to the exhaust passage 20. The exhaust passage 20 includes a first exhaust pipe 21, which is coupled to the engine main body 10, and a first catalytic converter 22, which is coupled to the downstream end in the exhaust gas flow of the first exhaust pipe 21. A three-way catalyst 30 is provided in the first catalytic converter 22. The three-way catalyst 30 oxidizes hydrocarbon (HC) and carbon monoxide (CO) contained in exhaust gas to generate water and carbon dioxide. Further, the three-way catalyst 30 reduces nitrogen oxides (NOx) contained in exhaust gas to generate nitrogen.

A second exhaust pipe 23 is coupled to the downstream end of the first catalytic converter 22. A second catalytic converter 24 is coupled to the downstream end of the second exhaust pipe 23. A PM filter 31 is provided in the second catalytic converter 24. The PM filter 31 traps PM contained in exhaust gas. The emission control device 100 performs a PM trap function by trapping PM contained in exhaust gas which flows in the exhaust passage 20 with the PM filter 31. PM includes a substance such as soot generated when fuel is burned in the engine main body 10 and ash generated when lubricating oil is burned in the engine main body 10. The second exhaust pipe 23 includes an exhaust temperature sensor 40 and a pressure sensor 41, which is provided on the downstream side of the exhaust temperature sensor 40. The exhaust temperature sensor 40 detects the temperature of exhaust gas in the second exhaust pipe 23, i.e., the temperature of exhaust gas at the side that is on the downstream side of the position in the exhaust passage 20 where the three-way catalyst 30 is provided and on the upstream side of the position in the exhaust passage 20 where the PM filter 31 is provided, and outputs a signal corresponding to the temperature. The pressure sensor 41 detects the pressure of exhaust in the second exhaust pipe 23, i.e., the downstream pressure of exhaust gas of the position in the exhaust passage 20 where the three-way catalyst 30 is provided and on the upstream side of the position in the exhaust passage 20 where the PM filter 31 is provided, and outputs a signal corresponding to the pressure. A third exhaust pipe 25 is coupled to the end of the second catalytic converter 24 at the downstream side. Additionally, the emission control device 100 includes a notification lamp 45.

The emission control device 100 includes a controller 60. Output signals from the exhaust temperature sensor 40 and the pressure sensor 41 are input to the controller 60. Further, output signals from an acceleration sensor 42, which detects the operation amount of the accelerator pedal, and a rotation speed sensor 43, which detects the rotation speed of the output shaft of the internal combustion engine, are input to the controller 60. The controller 60 executes filter regeneration control to burn and remove PM trapped by the PM filter 31.

Figure 2:
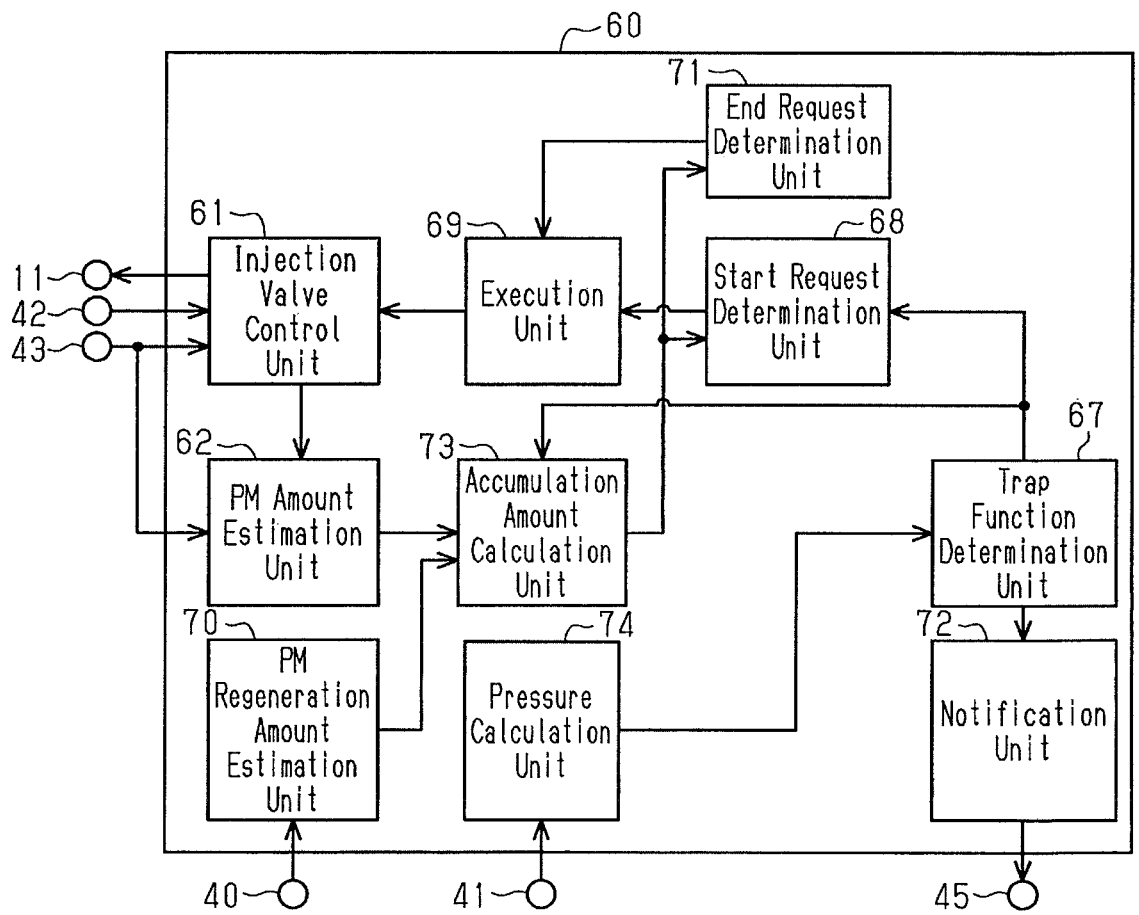
FIG. 2 is a block diagram showing functions of a controller of the emission control device shown in FIG. 1.

As shown in FIG. 2, the controller 60 includes, as functional units, an injection valve control unit 61, a PM amount estimation unit 62, an accumulation amount calculation unit 73, a pressure calculation unit 74, a trap function determination unit 67, a start request determination unit 68, an execution unit 69, a PM regeneration amount estimation unit 70, an end request determination unit 71, and a notification unit 72.

The injection valve control unit 61 is configured to calculate a target fuel injection amount, which is a target value of the amount of fuel injected from the fuel injection valve 11, based on, for example, output signals from the acceleration sensor 42 and the rotation speed sensor 43. The injection valve control unit 61 controls the fuel injection valve 11 so as to inject fuel corresponding to the amount of the calculated target fuel injection amount. When the target fuel injection amount is greater than the amount of fuel in a stoichiometric air-fuel ratio, the fuel is not all burned in the combustion chambers 10A and the exhaust gas containing unburned fuel is emitted to the first exhaust pipe 21 of the exhaust passage 20.

The PM amount estimation unit 62 is configured to calculate a PM emission amount, which is the amount of PM emitted from the engine main body 10 to the exhaust passage 20 per unit time, based on the engine rotation speed and the target fuel injection amount, which is calculated by the injection valve control unit 61. As the fuel injection amount becomes larger, the amount of PM contained in exhaust gas tends to become larger. Further, as the engine rotation speed becomes higher, the amount of exhaust gas emitted per unit time becomes larger. Thus, the amount of PM emitted to the exhaust passage 20 per unit time tends to become larger. In this manner, the amount of PM contained in the exhaust gas changes depending on the operation condition of the internal combustion engine. The PM amount estimation unit 62 stores a map indicating the relationship of the engine rotation speed and the fuel injection amount with the PM emission amount. The map is obtained in advance through experiments and simulations.

The accumulation amount calculation unit 73 is configured to cumulate PM emission amounts, which are calculated by the PM amount estimation unit 62, for each unit time. When cumulating the PM emission amounts, the accumulation amount calculation unit 73 stores the cumulative value. The accumulation amount calculation unit 73 outputs the cumulative value as a PM accumulation amount to calculate the PM accumulation amount for each unit time. Further, during the execution of filter regeneration control, the accumulation amount calculation unit 73 subtracts a PM regeneration amount (described later), which is calculated by the PM regeneration amount estimation unit 70, from the cumulative value when obtaining the cumulative value. The accumulation amount calculation unit 73 stores the cumulative value subsequent to the subtraction of the PM regeneration amount and outputs the cumulative value as the PM accumulation amount to calculate the PM accumulation amount for each unit time. The PM accumulation amount is the total amount of PM trapped by the PM filter 31. As described above, the PM accumulation amount is calculated based on the operation condition of the internal combustion engine. The accumulation amount calculation unit 73 is configured to stop calculating the PM accumulation amount when the trap function determination unit 67 (described later) determines that the PM trap function is not functioning in the emission control device 100. In the present embodiment, the accumulation amount calculation unit 73 stops calculating the PM accumulation amount by stopping cumulating the PM emission amounts.

The pressure calculation unit 74 is configured to calculate the pressure of exhaust gas in the second exhaust pipe 23 based on an output signal from the pressure sensor 41. That is, the pressure calculation unit 74 calculates the upstream pressure of the position in the exhaust passage 20 where the PM filter 31 is designed to be provided based on an output signal from the pressure sensor 41. When the PM filter 31 is provided, the pressure loss becomes larger in the exhaust passage 20 than that when the PM filter 31 is not provided. Thus, when the PM filter 31 is not provided, the pressure calculated by the pressure calculation unit 74 tends to be lower than that when the PM filter 31 is provided.

The trap function determination unit 67 is configured to determine whether or not the PM trap function is functioning in the emission control device 100. The trap function determination unit 67 determines that the PM trap function is not functioning in the emission control device 100 based on the pressure calculated by the pressure calculation unit 74 being less than a predetermined pressure. In the present embodiment, "the PM trap function is not functioning" corresponds to a case in which the PM filter 31 is inadvertently left uninstalled in the emission control device 100. The same pressure as the minimum pressure of the upstream pressure of where the PM filter 31 is designed to be provided, estimated based on the assumption that the PM filter 31 is attached to the exhaust passage 20, is set as the predetermined pressure. Thus, the pressure being less than the predetermined pressure means that the upstream pressure of where the PM filter 31 is designed to be provided is less than the upstream pressure that is estimated based on the assumption that the PM filter 31 is provided. The predetermined pressure is obtained and stored in advance through experiments and simulations.

The start request determination unit 68 is configured to determine whether or not a start request for the filter regeneration control exists. The start request determination unit 68 determines that the start request for the filter regeneration control exists when the PM accumulation amount calculated by the accumulation amount calculation unit 73 is greater than or equal to a first predetermined amount and the trap function determination unit 67 determines that the PM trap function is functioning in the emission control device 100. The first predetermined amount is set to be slightly smaller than a permitted upper value of the accumulation amount of PM in the PM filter 31. The first predetermined amount is obtained in advance through experiments and simulations and stored in the controller 60.

The execution unit 69 is configured to start the filter regeneration control when the start request determination unit 68 determines that the start request for the filter regeneration control exists. Further, after starting the filter regeneration control, the execution unit 69 ends the filter regeneration control when the end request determination unit 71 (described later) determines that an end request for the filter regeneration control exists. In the filter regeneration control, for example, exhaust gas containing unburned fuel is emitted to the exhaust passage 20 by controlling the injection valve control unit 61 so that the target fuel injection amount is greater than the fuel amount having a stoichiometric air-fuel ratio. The unburned fuel burns in the three-way catalyst 30 through oxidization reaction. This increases the temperature of the exhaust gas. When the temperature of the exhaust gas becomes so high that the PM can burn and the exhaust gas flows in the PM filter 31, the PM trapped by the PM filter 31 is burned and removed. In the following description, the temperature of exhaust gas at which PM can burn is defined as a regeneration temperature.

The PM regeneration amount estimation unit 70 is configured to calculate the PM regeneration amount, which is the amount of PM burned and removed through the filter regeneration control. In the present embodiment, the PM regeneration amount estimation unit 70 calculates the PM regeneration amount, which is the amount of PM burned and removed through the filter regeneration control, based on the temperature of exhaust gas in the second exhaust pipe 23 calculated based on an output signal from the exhaust temperature sensor 40. A map indicating the relationship of the temperature of exhaust gas in the second exhaust pipe 23 and the PM regeneration amount is obtained in advance through experiments and simulations and stored.

The end request determination unit 71 is configured to determine whether or not the end request for the filter regeneration control exists. After starting the filter regeneration control, the end request determination unit 71 determines that the end request exists when the PM accumulation amount calculated by the accumulation amount calculation unit 73 is less than or equal to a second predetermined amount. The second predetermined amount is sufficiently smaller than the permitted upper value of the accumulation amount of PM in the PM filter 31 and is set to be smaller than the first predetermined amount. The second predetermined amount is obtained in advance through experiments and simulations and stored in the controller 60.

The notification unit 72 is configured to issue a notification of an abnormality by turning on the notification lamp 45 when the trap function determination unit 67 determines that the PM trap function is not functioning in the emission control device 100.

The flow of a series of processes for filter regeneration control executed by the controller 60 will now be described with reference to the flowchart of FIG. 3. The series of processes is repeatedly executed in each predetermined cycle.

Figure 3:
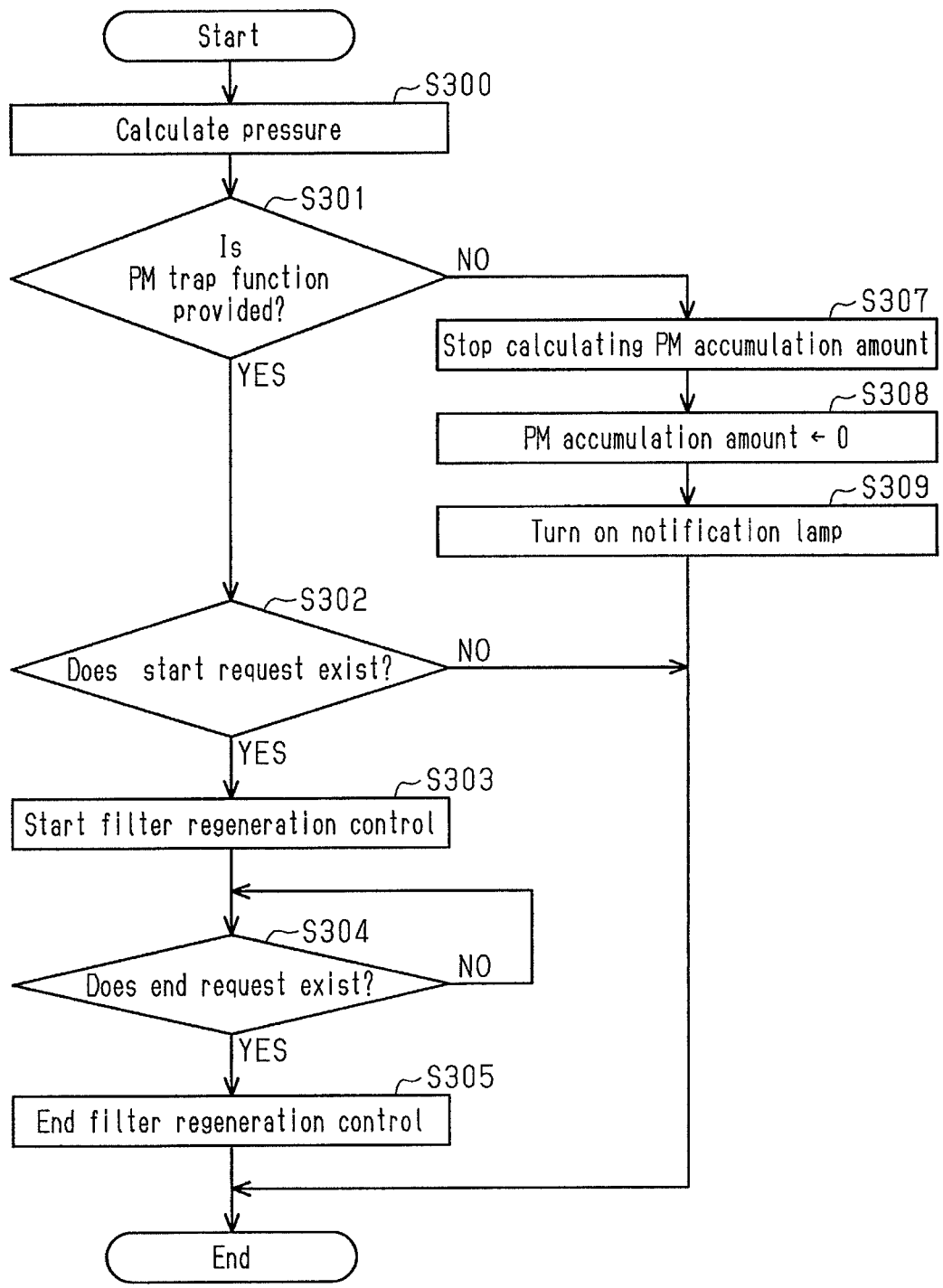
FIG. 3 is a flowchart showing the flow of a series of processes for filter regeneration control executed by the emission control device shown in FIG. 1.
Figure 4:
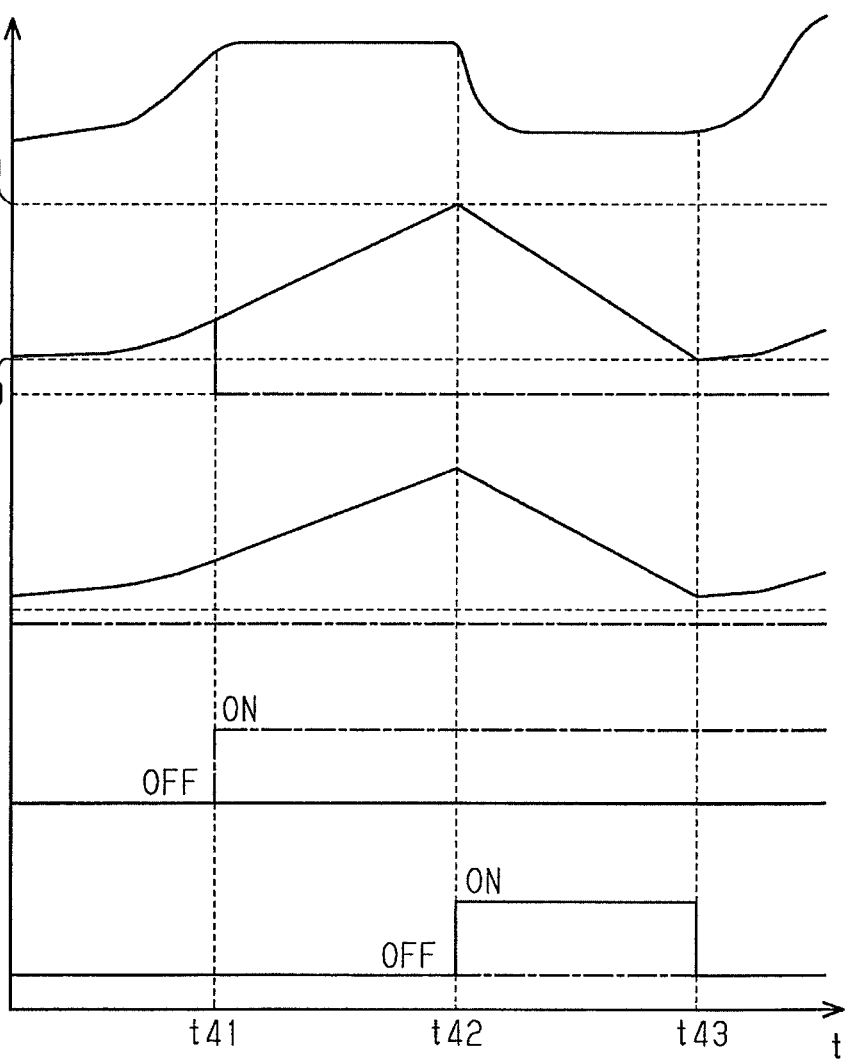
FIGS. 4A to 4E are timing charts showing changes in each parameter in the filter regeneration control.

As shown in FIG. 3, when the controller 60 starts the series of processes, the pressure calculation unit 74 first calculates the pressure of exhaust gas in the second exhaust pipe 23 (step S300). Then, in the process of step S301, the trap function determination unit 67 determines whether or not the PM trap function is functioning in the emission control device 100. If the pressure calculated by the pressure calculation unit 74 is greater than or equal to the predetermined pressure and the trap function determination unit 67 determines that the PM trap function is functioning (step S301: YES), the start request determination unit 68 then determines whether or not the start request for the filter regeneration control exists (step S302).

If the PM accumulation amount calculated by the accumulation amount calculation unit 73 is greater than or equal to the first predetermined amount, the trap function determination unit 67 determines that the PM trap function is functioning in the emission control device 100, and the start request determination unit 68 determines that the start request for the filter regeneration control exists (step S302: YES), the execution unit 69 starts the filter regeneration control (step S303).

Subsequently, the end request determination unit 71 determines whether or not the end request for the filter regeneration control exists (step S304). In the process of step S304, immediately after starting the filter regeneration control, the PM regeneration amount from when starting the filter regeneration control is small. Thus, the PM accumulation amount calculated by the accumulation amount calculation unit 73 exceeds the second predetermined amount, and the end request determination unit 71 determines that the end request does not exist (step S304: NO). If the end request determination unit 71 determines that the end request does not exist, the controller 60 repeatedly executes the process of step S304.

Afterwards, if a sufficient time has elapsed, the PM regeneration amount from when starting the filter regeneration control increases, and the PM accumulation amount calculated by the accumulation amount calculation unit 73 is less than or equal to the second predetermined amount, it is determined that the end request exists (step S304: YES). In this case, the controller 60 proceeds to step S305. In the process of step S305, the execution unit 69 ends the filter regeneration control. This causes the controller 60 to end the series of processes for the filter regeneration control.

Further, in the process of step S302, if the PM accumulation amount is less than the first predetermined amount, the start request determination unit 68 determines that the start request for the filter regeneration control does not exist (step S302: NO). In this case, the controller 60 ends the series of the processes without executing the processes of steps S303 to S305, i.e., the filter regeneration control.

In the process of step S301, if the pressure calculated by the pressure calculation unit 74 is, less than the predetermined pressure and the trap function determination unit 67 determines that the PM trap function is not functioning (step S301: NO), the controller 60 proceeds to the process of step S307. In the process of step S307, the accumulation amount calculation unit 73 stops cumulating the PM emission amounts and stops calculating the PM accumulation amount. When stopping calculating the PM accumulation amount, the accumulation amount calculation unit 73 sets the PM accumulation amount to 0 regardless of the cumulative value of the previous PM emission amounts (step S308). Subsequently, the accumulation amount calculation unit 73 outputs 0 as the PM accumulation amount. Afterwards, the notification unit 72 turns on the notification lamp 45 to issue a notification of the functional abnormality of the emission control device 100 (step S309). This causes the controller 60 to end the series of processes for the filter regeneration control.

The advantages of the present embodiment will now be described with reference to FIGS. 4A to 4E.

(1) As shown in FIG. 4A, the PM emission amount emitted from the engine main body 10 to the exhaust passage 20 changes depending on the operation condition of the internal combustion engine. As shown by the solid line in FIG. 4B, the PM accumulation amount calculated based on the operation condition of the internal combustion engine increases as time elapses. In the emission control device 100, when the PM filter 31 is installed and the PM trap function is functioning, the PM emitted to the exhaust passage 20 is trapped by the PM filter 31. Thus, as shown by the solid line in FIG. 4C, as time elapses, the upstream pressure calculated based on an output signal from the pressure sensor 41 increases. When the PM trap function is functioning in the emission control device 100, changes in the PM accumulation amount correlates with changes in the pressure. As shown by the solid line in FIG. 4C, when the PM trap function is functioning in the emission control device 100, the upstream pressure calculated based on an output signal from the pressure sensor 41 is constantly greater than or equal to the above predetermined pressure.

At a point in time t41, when a series of processes for the filter regeneration control is started, the pressure is greater than or equal to the predetermined pressure as shown by the solid line in FIG. 4C. Thus, it is determined that the PM trap function is functioning. Further, the PM accumulation amount is less than the first predetermined amount as shown by the solid line in FIG. 4B. Thus, it is determined that the start request for the filter regeneration control does not exist. Thus, at the point in time t41, the filter regeneration control is not executed as shown by the solid line in FIG. 4E. Subsequently, at a point in time t42, when sufficient time has elapsed from the point in time t41, the series of processes for the filter regeneration control is started. At this time, the PM accumulation amount is greater than or equal to the first predetermined amount. Thus, it is determined that the start request exists, and the filter regeneration control is started as shown by the solid line in FIG. 4E. This burns and removes the PM trapped by the PM filter 31 so that the pressure decreases as shown by the solid line in FIG. 4C. In addition, as shown in FIG. 4B, the PM accumulation amount decreases during the execution of the filter regeneration control.

At a point in time t43, when the PM accumulation amount is less than or equal to the second predetermined amount, the filter regeneration control ends as shown by the solid line in FIG. 4E. Afterwards, as shown in FIGS. 4B and 4C, PM is emitted from the engine main body 10 to the exhaust passage 20 and the PM is trapped by the PM filter 31 so that the PM accumulation amount and the pressure increase.

A case in which the PM trap function is not functioning in the emission control device 100 will now be described.

As shown by the long dashed short dashed line in FIG. 4C, when the PM trap function is not functioning in the emission control device 100, the upstream pressure calculated based on an output signal from the pressure sensor 41 is less than the predetermined pressure. The pressure never changes depending on the PM emitted from the exhaust passage 20. Thus, at the point in time t41, when the series of processes for the filter regeneration control is started, it is determined that the PM trap function is not functioning in the emission control device 100. In this case, as shown by the long dashed short dashed line in FIG. 4D, the notification lamp 45 is turned on. This issues a notification of the functional abnormality of the emission control device 100. In addition, at the point in time t41, when it is determined that the PM trap function is not functioning, as shown by the long dashed short dashed line in FIG. 4B, the calculation of the PM accumulation amount is stopped and 0 is set as the PM accumulation amount. Thus, subsequent to the point in time t41, the PM accumulation amount is 0. Subsequent to time the point in t41, when issuing a notification of the functional abnormality of the emission control device 100, the PM accumulation amount is not greater than or equal to the first predetermined amount and the start request for the filter regeneration control is not satisfied. This prevents the filter regeneration control from being executed as shown by the long dashed short dashed line in FIG. 4E.

In this manner, in the present embodiment, when the PM trap function is not functioning in the emission control device 100, the calculation of the PM accumulation amount is stopped. Thus, even if PM has hardly been trapped in the emission control device 100, an erroneous PM accumulation amount is not indicated. Accordingly, in the present embodiment, when the filter regeneration control is executed based on the PM accumulation amount being greater than or equal to the first predetermined amount, even if PM has hardly been trapped, the filter regeneration control is prevented from being erroneously executed.

(2) The present embodiment includes the pressure sensor 41, which detects the upstream pressure of where the PM filter 31 is provided. If the upstream pressure of where the PM filter 31 is provided is less than the upstream pressure that is estimated based on the assumption that the PM filter 31 is provided, it is determined that the PM trap function is not functioning. When the PM filter 31 is provided in the exhaust passage 20 of the internal combustion engine, the pressure loss becomes larger than that when the PM filter 31 is not provided. Thus, when the PM filter 31 is not provided, the upstream pressure of where the PM filter 31 is designed to be provided tends to be lower than that when the PM filter 31 is provided. In the present embodiment, it is determined that the PM trap function is not functioning when the upstream pressure of where the PM filter 31 is designed to be provided calculated based on an output signal from the pressure sensor 41 is less than the predetermined pressure and is less than that of where the PM filter 31 is designed to be provided, estimated based on the assumption that the PM filter 31 is provided. Thus, the state of the PM trap function can be properly identified in the emission control device 100 by taking into account the upstream pressure calculated based on an output signal of the pressure sensor 41.

(3) In the case in which the trap function is not functioning in the emission control device 100, when the accumulation amount calculation unit 73 stops calculating the PM accumulation amount, the accumulation amount calculation unit 73 sets the PM accumulation amount to 0 regardless of the cumulative value of the previous PM emission amounts. In the emission control device 100, when the PM trap function is not functioning because the PM filter 31 is inadvertently left uninstalled, the PM accumulation amount is 0. This allows the PM accumulation amount calculated based on the operation condition of the internal combustion engine to match the actual PM accumulation amount.

Second Embodiment

An emission control device for an internal combustion engine according to a second embodiment will now be described with reference to FIGS. 5 to 7F. The second embodiment differs from the first embodiment in the flow of a series of processes for filter generation control. Thus, like or same reference numerals are given to those components that are the same as the corresponding components of the first embodiment. Such components will not be described in detail.

Figure 5:
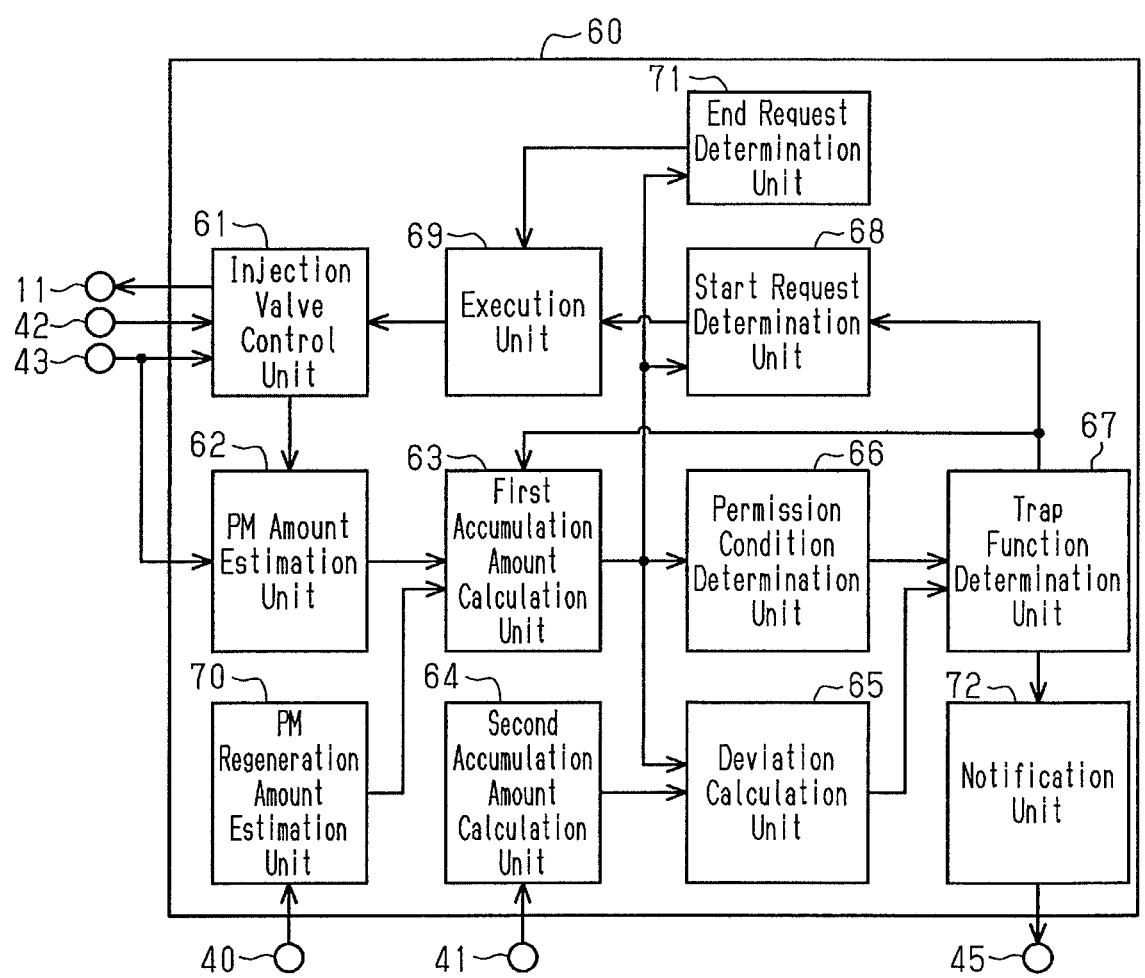
FIG. 5 is a block diagram showing functions of the controller of the emission control device according to a second embodiment.

As shown in FIG. 5, the controller 60 includes, as functional units, the injection valve control unit 61, the PM amount estimation unit 62, a first accumulation amount calculation unit 63, a second accumulation amount calculation unit 64, a deviation calculation unit 65, a permission condition determination unit 66, the trap function determination unit 67, the start request determination unit 68, the execution unit 69, the PM regeneration amount estimation unit 70, the end request determination unit 71, and the notification unit 72.

The injection valve control unit 61 is configured to calculate a target fuel injection amount, which is a target value of the amount of fuel injected from the fuel injection valve 11, based on, for example, output signals from the acceleration sensor 42 and the rotation speed sensor 43. The injection valve control unit 61 controls the fuel injection valve 11 so as to inject fuel corresponding to the amount of the calculated target fuel injection amount. When the target fuel injection amount is greater than the amount of fuel in a stoichiometric air-fuel ratio, the fuel is not all burned in the combustion chambers 10A and the exhaust gas containing unburned fuel is emitted to the first exhaust pipe 21 of the exhaust passage 20.

The PM amount estimation unit 62 is configured to calculate a PM emission amount, which is the amount of PM emitted from the engine main body 10 to the exhaust passage 20 per unit time, based on the engine rotation speed and the target fuel injection amount, which is calculated by the injection valve control unit 61. As the fuel injection amount becomes larger, the amount of PM contained in exhaust gas tends to become larger. Further, as the engine rotation speed becomes higher, the amount of exhaust gas emitted per unit time becomes larger. Thus, the amount of PM emitted to the exhaust passage 20 per unit time tends to become larger. In this manner, the amount of PM contained in the exhaust gas changes depending on the operation condition of the internal combustion engine. The PM amount estimation unit 62 stores a map indicating the relationship of the engine rotation speed and the fuel injection amount with the PM emission amount. The map is obtained in advance through experiments and simulations.

The first accumulation amount calculation unit 63 is configured to cumulate the PM emission amounts, which are calculated by the PM amount estimation unit 62, for each unit time. When cumulating the PM emission amounts, the first accumulation amount calculation unit 63 stores the cumulative value. The first accumulation amount calculation unit 63 outputs the cumulative value as a first accumulation amount to calculate the PM accumulation amount for each unit time. Further, during the execution of filter regeneration control, the first accumulation amount calculation unit 63 subtracts a PM regeneration amount (described later), which is calculated by the PM regeneration amount estimation unit 70, from the cumulative value when obtaining the cumulative value. The first accumulation amount calculation unit 63 stores the cumulative value subsequent to the subtraction of the PM regeneration amount and outputs the cumulative value as the first accumulation amount to calculate the first accumulation amount for each unit time. The first accumulation amount is the total amount of PM trapped by the PM filter 31. As described above, the first accumulation amount is calculated based on the operation condition of the internal combustion engine. The first accumulation amount calculation unit 63 is configured to stop calculating the first accumulation amount when the trap function determination unit 67 (described later) determines that the PM trap function is not functioning in the emission control device 100. In the present embodiment, the first accumulation amount calculation unit 63 stops calculating the first accumulation amount by stopping cumulating the PM emission amounts.

The second accumulation amount calculation unit 64 is configured to calculate the PM accumulation amount, which is the total amount of PM trapped by the PM filter 31, based on an output signal from the pressure sensor 41. When the PM trap function is functioning normally in the emission control device 100, the PM filter 31 traps PM so that the pressure loss changes in the exhaust passage 20. That is, as the PM accumulation amount of the PM filter 31 becomes larger, the upstream pressure of exhaust gas of the PM filter 31 tends to become higher in the exhaust passage 20.

In some cases, when the PM filter 31 is inadvertently left uninstalled during maintenance of the internal combustion engine or when an abnormality occurs in the PM filter 31 due to some reasons, the emission control device 100 hardly traps PM using the PM filter 31. When the PM trap function is not functioning in the emission control device 100 in such a manner, PM can hardly be trapped and thus the pressure loss in the exhaust passage 20 changes in a limited manner. Thus, even if PM is being emitted to the exhaust passage 20, the upstream pressure of exhaust gas of the position in the exhaust passage 20 where the PM filter 31 is designed to be provided tends to change in a limited manner. Accordingly, the upstream pressure of exhaust gas of the position in the exhaust passage 20 where the PM filter 31 is designed to be provided correlates with the actual PM accumulation amount corresponding to the PM trap function of the PM filter 31. Thus, the PM accumulation amount corresponding to the PM trap function of the PM filter 31 can be calculated by detecting the pressure of exhaust gas in the second exhaust pipe 23 with the pressure sensor 41. The second accumulation amount calculation unit 64 stores a map indicating the relationship of the pressure at the second exhaust pipe 23 calculated based on an output signal from the pressure sensor 41 and the PM accumulation amount corresponding to the PM trap function of the PM filter 31. The map is obtained in advance through experiments and simulations. In the following description, the PM accumulation amount calculated by the second accumulation amount calculation unit 64 based on an output signal from the pressure sensor 41 is defined as a second accumulation amount. The second accumulation amount is obtained in the same calculation cycle as that of the first accumulation amount.

The deviation calculation unit 65 is configured to calculate a subtraction value obtained by subtracting the second accumulation amount, which is calculated by the second accumulation amount calculation unit 64, from the first accumulation amount, which is calculated by the first accumulation amount calculation unit 63.

The permission condition determination unit 66 determines whether or not a permission condition is satisfied. The permission condition determination unit 66 is configured to determine that the permission condition is satisfied when the first accumulation amount, which is calculated by the first accumulation amount calculation unit 63, is greater than or equal to the first predetermined amount.

The trap function determination unit 67 is configured to determine whether or not the PM trap function is functioning in the emission control device 100 when the permission condition determination unit 66 determines that the permission condition is satisfied. The trap function determination unit 67 determines that the PM trap function is not functioning in the emission control device 100 based on the subtraction value calculated by the deviation calculation unit 65 being greater than or equal to a predetermined value.

In the present embodiment, "the PM trap function is not functioning" includes a case in which the PM trap function is not completely provided, for example, the PM filter 31 is inadvertently left uninstalled in the emission control device 100, and a case in which the PM filter 31 can hardly trap PM due to some reasons although the PM filter 31 is attached. In the present embodiment, when the PM trap function is not functioning, the above subtraction value when the first accumulation amount reaches the first predetermined amount, i.e., a subtraction value obtained by subtracting, from the first accumulation amount, the second accumulation amount when the first accumulation amount reaches the first predetermined amount, is obtained in advance through experiments and simulations. The same value as the subtraction value is set as the predetermined value.

The start request determination unit 68 is configured to determine whether or not a start request for the filter regeneration control exists. When the first accumulation amount calculated by the first accumulation amount calculation unit 63 is greater than or equal to a second predetermined amount, which is greater than the first predetermined amount, and the trap function determination unit 67 determines that the PM trap function is functioning in the emission control device 100, the start request determination unit 68 determines that the start request for the filter regeneration control exists. The second predetermined amount is set to be slightly smaller than a permitted upper value of the accumulation amount of PM in the PM filter 31. The second predetermined amount is obtained in advance through experiments and simulations and stored in the controller 60.

The execution unit 69 is configured to start the filter regeneration control when the start request determination unit 68 determines that the start request for the filter regeneration control exists. Further, after starting the filter regeneration control, the execution unit 69 ends the filter regeneration control when the end request determination unit 71 (described later) determines that an end request for the filter regeneration control exists. In the filter regeneration control, for example, exhaust gas containing unburned fuel is emitted to the exhaust passage 20 by controlling the injection valve control unit 61 so that the target fuel injection amount is greater than the fuel amount having a stoichiometric air-fuel ratio. The unburned fuel burns in the three-way catalyst 30 through oxidization reaction. This increases the temperature of the exhaust gas. When the temperature of the exhaust gas becomes so high that the PM can burn and the exhaust gas flows in the PM filter 31, the PM trapped by the PM filter 31 is burned and removed. In the following description, the temperature of exhaust gas at which PM can burn is defined as a regeneration temperature.

The PM regeneration amount estimation unit 70 is configured to calculate the PM regeneration amount, which is the amount of PM burned and removed through the filter regeneration control. In the present embodiment, the PM regeneration amount estimation unit 70 calculates the PM regeneration amount, which is the amount of PM burned and removed through the filter regeneration control, based on the temperature of exhaust gas in the second exhaust pipe 23 calculated based on an output signal from the exhaust temperature sensor 40. A map indicating the relationship of the temperature of exhaust gas in the second exhaust pipe 23 and the PM regeneration amount is obtained in advance through experiments and simulations and stored.

The end request determination unit 71 is configured to determine whether or not the end request for the filter regeneration control exists. After starting the filter regeneration control, the end request determination unit 71 determines that the end request exists when the first accumulation amount calculated by the first accumulation amount calculation unit 63 is less than or equal to a third predetermined amount. The third predetermined amount is sufficiently smaller than the permitted upper value of the accumulation amount of PM in the PM filter 31 and is set to be smaller than the first predetermined amount and the second predetermined amount. The third predetermined amount is obtained in advance through experiments and simulations and stored in the controller 60.

The notification unit 72 is configured to issue a notification of an abnormality by turning on the notification lamp 45 when the trap function determination unit 67 determines that the PM trap function is not functioning in the emission control device 100.

The flow of a series of processes for filter regeneration control executed by the controller 60 will now be described with reference to the flowchart of FIG. 6. The series of processes is repeatedly executed in each predetermined cycle.

Figure 6:
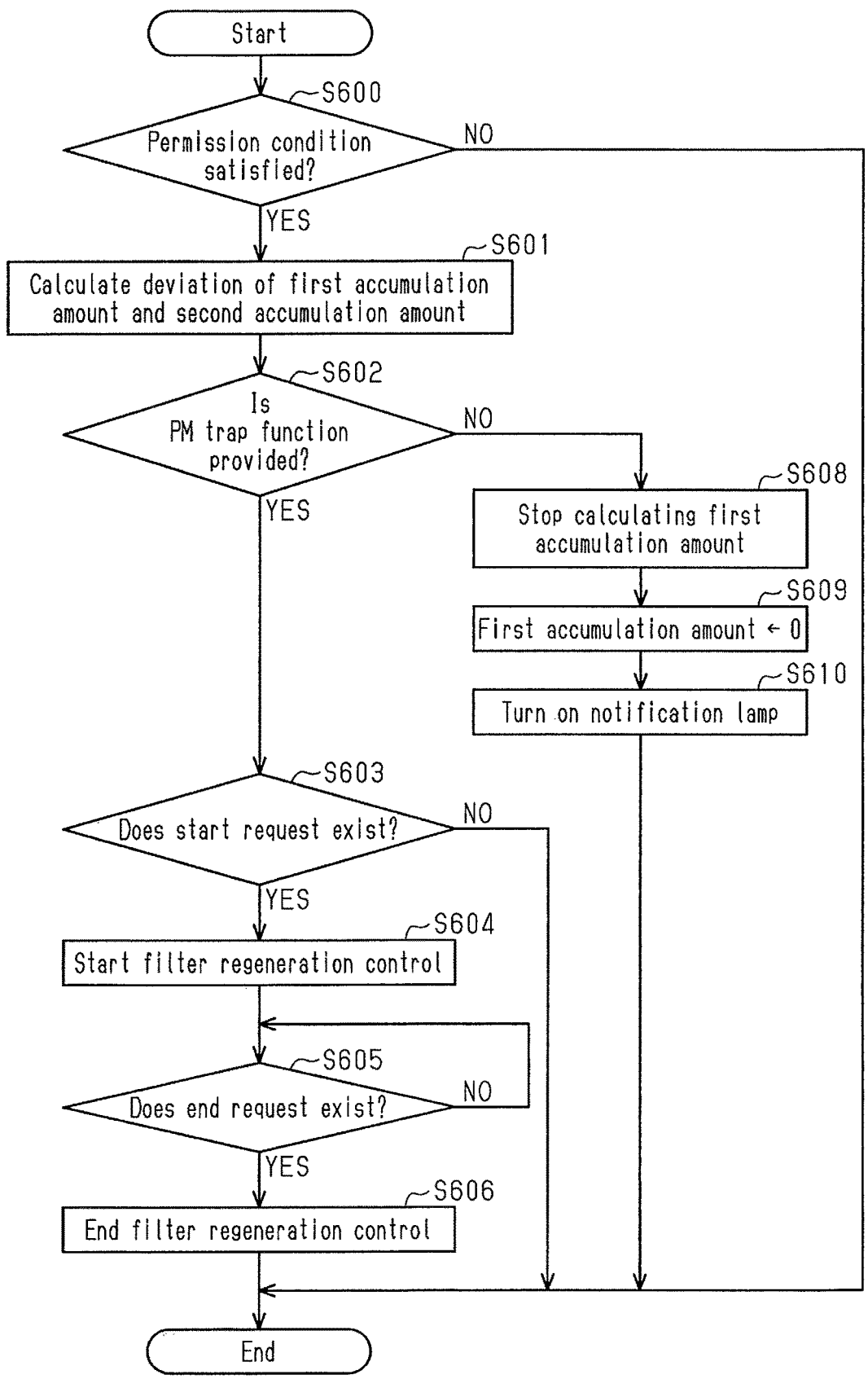
FIG. 6 is a flowchart showing the flow of a series of processes for filter regeneration control executed by the emission control device for an internal combustion engine.

As shown in FIG. 6, when the controller 60 starts the series of processes, the permission condition determination unit 66 first determines whether or not the permission condition is satisfied (step S600). If the first accumulation amount calculated by the first accumulation amount calculation unit 63 is greater than or equal to the first predetermined amount (step S600: YES), the deviation calculation unit 65 then calculates the subtraction value obtained by subtracting the second accumulation amount, which is calculated by the second accumulation amount calculation unit 64, from the first accumulation amount, which is calculated by the first accumulation amount calculation unit 63 (step S601).

Then, in the process of step S602, the trap function determination unit 67 determines whether or not the PM trap function is functioning in the emission control device 100. If the subtraction value obtained by subtracting the second accumulation amount from the first accumulation amount is less than the predetermined value and the trap function determination unit 67 determines that the PM trap function is functioning (step S602: YES), the start request determination unit 68 then determines whether or not the start request for the filter regeneration control exists (step S603). If the first accumulation amount is greater than or equal to the second predetermined amount, the trap function determination unit 67 determines that the PM trap function is functioning in the emission control device 100, and the start request determination unit 68 determines that the start request for the filter regeneration control exists (step S603: YES), the execution unit 69 starts the filter regeneration control (step S604). Subsequently, the end request determination unit 71 determines whether or not the end request for the filter regeneration control exists (step S605).

In the process of step S605, immediately after starting the filter regeneration control, the PM regeneration amount from when starting the filter regeneration control is small. Thus, the PM accumulation amount calculated by the accumulation amount calculation unit 73 exceeds the third predetermined amount, and the end request determination unit 71 determines that the end request does not exist (step S605: NO). If the end request determination unit 71 determines that the end request does not exist, the controller 60 repeatedly executes the process of step S605. Afterwards, if sufficient time has elapsed, the PM regeneration amount increases from when starting the filter regeneration control, and the PM accumulation amount calculated by the accumulation amount calculation unit 73 is less than or equal to the third predetermined amount, it is determined that the end request exists (step S605: YES). In this case, the controller 60 proceeds to step S606. In the process of step S606, the execution unit 69 ends the filter regeneration control. The controller 60 ends the series of processes for the filter regeneration control.

Further, in the process of step S603, if the first accumulation amount is less than the second predetermined amount, the start request determination unit 68 determines that the start request for the filter regeneration control does not exist (step S603: NO). In this case, the controller 60 ends the series of the processes without executing the processes of steps S604 to S606, i.e., the filter regeneration control.

In the process of step S602, if the subtraction value obtained by subtracting the second accumulation amount from the first accumulation amount is greater than or equal to the predetermined value and the trap function determination unit 67 determines that the PM trap function is not functioning (step S602: NO), the controller 60 proceeds to the process of step S608. In the process of step S608, the first accumulation amount calculation unit 63 stops cumulating the PM emission amounts and stops calculating the first accumulation amount. When stopping calculating the first accumulation amount, the first accumulation amount calculation unit 63 sets the first accumulation amount to 0 regardless of the cumulative value of the previous PM emission amounts (step S609). Subsequently, the first accumulation amount calculation unit 63 outputs 0 as the first accumulation amount. Afterwards, the notification unit 72 turns on the notification lamp 45 to issue a notification of the functional abnormality of the emission control device 100 (step S610). The controller 60 ends the series of processes for the filter regeneration control.

In the process of step S600, if the first accumulation amount is less than the first predetermined amount and the permission condition determination unit 66 determines that the permission condition is not satisfied (step S600: NO), the controller 60 ends the series of processes for the filter regeneration control without executing the subsequent processes.

The advantages of the present embodiment will now be described with reference to FIGS. 7A to 7E.

(4) As shown in FIG. 7A, the PM emission amount emitted from the engine main body 10 to the exhaust passage 20 changes depending on the operation condition of the internal combustion engine. As shown by the solid line in FIG. 7B, the first accumulation amount calculated based on the operation condition of the internal combustion engine increases as time elapses. Further, when the PM trap function is functioning in the emission control device 100, the PM emitted to the exhaust passage 20 is trapped by the PM filter 31. Thus, as shown by the solid line in FIG. 7C, as time elapses, the second accumulation amount calculated based on an output signal from the pressure sensor 41 increases. When the PM trap function is functioning in the emission control device 100, the first accumulation amount changes substantially in the same manner as the second accumulation amount.

As shown in FIG. 7B, at a point in time t71, when the first accumulation amount increases to be greater than or equal to the first predetermined amount, the permission condition is satisfied as shown by the solid line in FIG. 7D. Then, it is determined whether or not the PM trap function is provided based on the subtraction value obtained by subtracting the second accumulation amount from the first accumulation amount. When the first accumulation amount and the second accumulation amount change substantially in the same manner, the subtraction value is less than the predetermined value. Thus, it is determined that the PM trap function is functioning in the emission control device 100. At the point in time t71, the first accumulation amount is less than the second predetermined amount and the start request for the filter regeneration control does not exist. Thus, as shown in FIG. 7F, the filter regeneration control is not executed. In this manner, since the first predetermined amount is less than the second predetermined amount, the determination of whether or not the PM trap function is functioning in the emission control device 100 is made before the PM accumulation amount increases such that the filter regeneration control is executed. Subsequently, at a point in time t72, when sufficient time has elapsed from the point in time t71, the permission condition is satisfied and the first accumulation amount is greater than or equal to the second predetermined amount. Thus, it is determined that the start request exists, and the filter regeneration control is started as shown by the solid line in FIG. 7F. Thus, the PM trapped by the PM filter 31 is burned and removed, and the second accumulation amount decreases as shown by the solid line in FIG. 7C. Additionally, as shown in FIG. 7B, the first accumulation amount decreases during the execution of the filter regeneration control.

At a point in time t74, when the first accumulation amount is less than or equal to the third predetermined amount, the filter regeneration control is ended as shown in the solid line in FIG. 7F. Subsequently, PM is emitted from the engine main body 10 to the exhaust passage 20 and the PM filter 31 traps PM so that the first accumulation amount and the second accumulation amount increase as shown in FIGS. 7B and 7C. As shown by the solid line in FIG. 7B, the first accumulation amount is less than the first predetermined amount at a point in time t73, which is from when the filter regeneration control starts (time t72) to when the filter regeneration control ends (time t74). Thus, as shown by the solid line in FIG. 7D, the permission condition is not satisfied at the point in time t73.

The case in which the PM trap function is not functioning in the emission control device 100 will now be described. Referring to FIGS. 7A to 7F, the case in which the PM filter 31 is attached but PM can hardly be trapped by the PM filter 31 due to some reasons will be described as an example.

As shown by the long dashed short dashed line in FIG. 7C, when the PM trap function is not functioning in the emission control device 100, the second accumulation amount is 0 and never changes depending on the PM emitted to the exhaust passage 20. Thus, at the point in time t71, when the permission condition is satisfied as shown in FIG. 7D and whether or not the PM accumulation function is provided is determined based on the subtraction value obtained by subtracting the second accumulation amount from the first accumulation amount, the subtraction value is greater than or equal to the predetermined value and it is determined that the PM trap function is not functioning in the emission control device 100. In this case, as shown by the long dashed short dashed line in FIG. 7E, the notification lamp 45 is turned on. This issues a notification of the functional abnormality of the emission control device 100. In addition, at the point in time t71, when it is determined that the PM trap function is not functioning, as shown by the long dashed short dashed line in FIG. 7B, the calculation of the first accumulation amount is stopped and 0 is set as the first accumulation amount. Thus, subsequent to the point in time t71, the first accumulation amount is 0. Subsequent to the point in time t71, when issuing a notification of the functional abnormality of the emission control device 100, the first accumulation amount is not greater than or equal to the second predetermined amount and the start request for the filter regeneration control is not satisfied. This prevents the filter regeneration control from being executed as shown by the long dashed short dashed line in FIG. 7F. Further, in this case, as shown by the long dashed short dashed line in FIG. 7D, the permission condition is not satisfied subsequent to the point in time t71.

In this manner, in the present embodiment, when the PM trap function is not functioning in the emission control device 100, the calculation of the first accumulation amount is stopped. Thus, even if PM has hardly been trapped in the emission control device 100, an erroneous first accumulation amount is not indicated. Accordingly, in the present embodiment, when the filter regeneration control is executed based on the first accumulation amount being greater than or equal to the second predetermined amount, even if PM has hardly been trapped, the filter regeneration control is prevented from being erroneously executed.

(5) In the present embodiment, the second accumulation amount is calculated based on an output signal from the pressure sensor 41, which detects the upstream pressure of where the PM filter 31 is provided. The second accumulation amount calculated based on the output signal from the pressure sensor 41 remains substantially unchanged when the PM trap function is not functioning in the emission control device 100. The first accumulation amount calculated based on the operation condition of the internal combustion engine changes when the internal combustion engine is running. Thus, the subtraction value obtained by subtracting the second accumulation amount, which is calculated based on an output signal from the pressure sensor 41, from the first accumulation amount, which is calculated based on the operation condition of the internal combustion engine, tends to be large when the PM trap function is not functioning in the emission control device 100. Whether or not the PM trap function is provided in the emission control device 100 can be determined based on the subtraction value being greater than or equal to the predetermined value. Thus, the state of the PM trap function can be properly identified in the emission control device 100 by comparing the first accumulation amount calculated based on the operation condition of the internal combustion engine with the second accumulation amount calculated based on the output signal of the pressure sensor 41.

(6) In the case in which the trap function is not functioning in the emission control device 100, when the first accumulation amount calculation unit 63 stops calculating the first accumulation amount, the first accumulation amount calculation unit 63 sets the first accumulation amount to 0 regardless of the cumulative value of the previous PM emission amounts. When the PM trap function is not functioning in the emission control device 100, the second accumulation amount frequently becomes 0. This allows the first accumulation amount, which is calculated based on the operation condition of the internal combustion engine, to match the second accumulation amount, which is calculated based on an output signal from the pressure sensor 41, i.e., the actual PM accumulation amount corresponding to the PM trap function of the PM filter 31.

(7) The first accumulation amount being greater than or equal to the first predetermined amount is set as the permission condition. When the permission condition is satisfied, whether or not the PM trap function is provided in the emission control device 100 is determined. The first predetermined amount is less than the second predetermined amount. Before the condition for starting the filter regeneration control is satisfied, whether or not the PM trap function is provided in the emission control device 100 can be determined. Thus, even if the PM trap function is not functioning, that state can be quickly determined.

The above-illustrated embodiment may be modified as follows. The following modifications may be combined as necessary.

In the first embodiment, the trap function determination unit 67 determines that the PM trap function is not functioning when the pressure calculated by the pressure calculation unit 74 is less than the predetermined pressure and less than the pressure in the case in which the PM filter 31 is provided. Instead, the trap function determination unit 67 may determine that the PM trap function is not functioning when the pressure calculated by the pressure calculation unit 74 is less than the pressure in a case in which the PM filter 31 is provided and PM is hardly trapped by the PM filter 31. In this case, when the PM filter 31 is attached, a value that is slightly higher than the minimum pressure of the upstream pressure of where the PM filter 31 is designed to be provided can be adopted as the predetermined pressure. Even in this case, the predetermined pressure simply needs to be obtained in advance through experiments and simulations.

In the second embodiment, the first predetermined amount may be changed as long as it is greater than 0 and less than or equal to the second predetermined amount. For example, when the first predetermined amount is set to be equal to the second predetermined amount, the permission condition and the start request for the filter regeneration control are satisfied at the same timing. In such a configuration, the determination of whether or not the PM trap function is provided is made prior to the execution of the filter regeneration control, and the filter regeneration control is not executed when the PM trap function is not functioning. It is desirable that the first predetermined amount be smaller in order to quickly determine a state in which the PM trap function is not functioning in the emission control device 100.

In the second embodiment, the determination of whether or not the permission condition is satisfied does not necessarily have to be made in the series of processes for the filter regeneration control. In this case, the process of step S600 can be omitted in the flowchart of FIG. 6.

In the second embodiment, the example in which the second accumulation amount, which is the total amount of PM actually trapped by the PM filter 31, is calculated based on an output signal from the pressure sensor 41. The manner of calculating the second accumulation amount may be changed. In this case, the second accumulation amount simply needs to be calculated based on other parameters that correlate with the second accumulation amount. For example, a differential pressure sensor that detects the differential pressure of the upstream pressure of the PM filter 31 and the downstream pressure may be provided to calculate the second accumulation amount based on an output signal from the differential sensor. Alternatively, a flow rate sensor that detects the flow rate of exhaust gas that has passed through the PM filter 31 may be provided in the third exhaust pipe 25 to calculate the second accumulation amount based on an output signal from the flow rate sensor.

In the second embodiment, whether or not the PM trap function is functioning in the emission control device 100 is determined based on the subtraction value obtained by subtracting the second accumulation amount from the first accumulation amount. The configuration of determining whether or not the PM trap function is functioning in the PM filter 31 may be changed. For example, it may be determined that the PM trap function is not functioning in the emission control device 100 based on the change amount of the second accumulation amount for a predetermined time being slight. Further, a load sensor that detects the strength of applied impact may be provided in the second catalytic converter 24. When the load sensor detects that a load greater than or equal to a predetermined load has been applied to the second catalytic converter 24, it may be determined that the PM trap function is not functioning in the emission control device 100. As the predetermined load, a load enough to impair the function of the PM filter 31 simply needs to be set and obtained in advance with a certain method such as experiments.

In the second embodiment, when the PM trap function is not functioning in the emission control device 100, the calculation of the first accumulation amount is stopped and the cumulative value of the PM emission amount is set to 0. This configuration may be changed. When stopping the calculation of the first accumulation amount, the cumulative value of the PM emission amount may be maintained at the previous value instead of setting the cumulative value to 0. In addition, when the PM trap function is not functioning in the emission control device 100, the calculation of the first accumulation amount is stopped and the output of the first accumulation amount is set to 0. This configuration may be changed. For example, when stopping the calculation of the first accumulation amount, the output of the first accumulation amount may be set to be equal to the cumulative value of the previous PM emission amounts. In this case, the output of the first accumulation amount after stopping the calculation of the first accumulation amount is equal to the set cumulative value and fixed. Additionally, after stopping the calculation of the first accumulation amount, the output of the first accumulation amount does not have to be set to the predetermined value. In this case, after stopping the calculation of the first accumulation amount, a signal indicating the first accumulation amount is not output from the first accumulation amount calculation unit 63. This modification can be applied to the first embodiment by replacing the first accumulation amount with the PM accumulation amount and replacing the first accumulation amount calculation unit 63 with the accumulation amount calculation unit 73.

In the second embodiment, as the manner of stopping the calculation of the first accumulation amount when the PM trap function is not functioning in the emission control device 100, the PM emission amounts are not cumulated in the first accumulation amount calculation unit 63. The calculation of the first accumulation amount does not have to be stopped in this manner. For example, a configuration may be adopted in which the PM emission amounts are cumulated in the first accumulation amount calculation unit 63 but the cumulative value is not output as the first accumulation amount. This modification can be applied to the first embodiment by replacing the first accumulation amount with the PM accumulation amount and replacing the first accumulation amount calculation unit 63 with the accumulation amount calculation unit 73.

When the PM trap function is not functioning in the emission control device 100, the notification lamp 45 is turned on. The functional abnormality of the emission control device 100 does not have to be notified of in this manner. For example, when it is determined that the PM trap function is not functioning in the emission control device 100, that determination is stored in the controller 60. The functional abnormality of the emission control device 100 is detected by accessing the controller 60 during the maintenance. In this configuration, the process of step S209 shown in FIG. 3 and the process of step S610 shown in FIG. 6 can be omitted.

The position of the pressure sensor 41 can be changed as long as it is located on the upstream side of the position in the exhaust passage 20 where the PM filter 31 is provided. For example, the pressure sensor 41 may be provided in the first exhaust pipe 21 or the first catalytic converter 22. As another option, the pressure sensor 41 may be provided in the second catalytic converter 24 on the upstream side of where the PM filter 31 is provided.

The PM regeneration amount estimation unit 70 calculates the PM regeneration amount, which is the amount of PM burned and removed through the filter regeneration control, based on the temperature of exhaust gas in the second exhaust pipe 23. The PM regeneration amount does not have to be calculated in this configuration. Instead, the PM regeneration amount can be calculated based on other parameters that correlate with the amount of PM burned and removed by executing the filter regeneration control. For example, the PM regeneration amount can be calculated based on the time elapsed from when starting the filter regeneration control. After starting the filter regeneration control, the temperature of the exhaust gas reaches the regeneration temperature a predetermined time later. Thus, when calculating the PM regeneration amount based on the elapsed time in such a manner, it is preferable to measure the time from when the temperature of the exhaust gas in the second exhaust pipe 23 reaches the regeneration temperature in order to properly calculate the amount of PM burned and removed through the filter regeneration control.

In the first embodiment, the filter regeneration control is ended by determining that the end request exists when the PM accumulation amount is less than or equal to the second predetermined amount. Further, in the second embodiment, the filter regeneration control is ended by determining that the end request exists when the first accumulation amount is less than or equal to the third predetermined amount. Instead of these configurations, a counter unit may be provided. The counter unit measures the time when the temperature of exhaust gas in the second exhaust pipe 23 is greater than or equal to the above regeneration temperature based on an output signal from the exhaust temperature sensor 40, and it is determined that the end request exists when the elapsed time measured by the counter unit is greater than or equal to the determination time. When this configuration is adopted, for example, experiments and simulations simply need to be conducted in advance to obtain the time from when the temperature of exhaust gas becomes greater than or equal to the regeneration temperature to when the amount of PM trapped by the PM filter 31 becomes less than or equal to a predetermined amount that is sufficiently smaller than the permitted upper limit value, and the time simply needs to be stored in the controller 60 as the determination time.

In the above embodiments, the accumulation amount of soot and the accumulation amount of ash in the PM filter 31 may be separately calculated as the PM accumulation amount. In such a configuration, for example, when the PM trap function is not functioning, the calculation of both the accumulation amount of soot and the accumulation amount of ash that are separately calculated may be stopped. Further, when the PM trap function is not functioning, the calculation of only one of the accumulation amount of soot and the accumulation amount of ash, which are separately calculated, may be stopped. Thus, in the configuration of separately calculating the accumulation amount of soot and the accumulation amount of ash as the PM accumulation amount, as the emission control device for an internal combustion engine that stops calculating the PM accumulation amount, the calculation of at least one of the accumulation amount of soot and the accumulation amount of ash simply needs to be stopped when the PM trap function is not functioning.

The above embodiments are described as examples of applying an emission control device to a gasoline engine serving as an internal combustion engine. The same configuration as those of the above embodiments may be adopted for the configuration of applying an emission control device to a diesel engine serving as an internal combustion engine.

In each of the above embodiments, the controller 60 does not have to include a computer processing unit and a memory and execute all the processes described above using software. For example, the controller 60 may include a dedicated hardware (application specific integrated circuit: ASIC) that executes at least part of the processes. That is, the controller 60 may be a processing circuitry including 1) one or more dedicated hardware circuits such as ASIC, 2) one or more processors (microcomputers) running on computer programs (software), or 3) a combination thereof.

Therefore, the present examples and embodiments are to be considered as illustrative and not restrictive and the disclosure is not to be limited to the examples and embodiments given herein.

The invention claimed is:

1. An emission control device for an internal combustion engine, the emission control device configured to perform a particulate matter trap function of trapping, with a particulate filter, particulate matter contained in exhaust gas which flows in an exhaust passage of the internal combustion engine, the emission control device comprising:
   a controller; and
   a pressure sensor configured to detect upstream pressure in an exhaust gas flow of a position in the exhaust passage where the particulate filter is designed to be provided,
   wherein the controller is configured to
      calculate a particulate matter accumulation amount, which is a total amount of particulate matter trapped by the particulate filter based on an operation condition of the internal combustion engine, and
      determine that the particulate filter is uninstalled in the emission control device and stop calculating the particulate matter accumulation amount when the upstream pressure calculated based on an output signal from the pressure sensor is less than upstream pressure that is estimated based on an assumption that the particulate filter is provided.

2. An emission control device for an internal combustion engine, the emission control device configured to perform a particulate matter trap function of trapping, with a particulate filter, particulate matter contained in exhaust gas which flows in an exhaust passage of the internal combustion engine, the emission control device comprising:
   a controller; and
   a pressure sensor configured to detect upstream pressure in an exhaust gas flow of a position in the exhaust passage where the particulate filter is designed to be provided, wherein
the controller is configured to calculate a particulate matter accumulation amount, which is a total amount of particulate matter trapped by the particulate filter based on an output signal from the pressure sensor,
the particulate matter accumulation amount calculated based on an operation condition of the internal combustion engine is defined as a first accumulation amount,
the particulate matter accumulation amount calculated based on the output signal from the pressure sensor is defined as a second accumulation amount, and
the emission control device is configured to determine that the particulate filter is uninstalled in the emission control device when a subtraction value obtained by subtracting the second accumulation amount from the first accumulation amount is greater than or equal to a predetermined value.

* * * * *